United States Patent [19]

Kragh et al.

[11] Patent Number: 4,756,892

[45] Date of Patent: Jul. 12, 1988

[54] METHOD OF SEPARATING FROM FLUE GASES SUCH GASES AS ARE AGRESSIVE AND INJURIOUS TO THE ENVIRONMENT, AND PLANT TO CARRY THE METHOD INTO EFFECT

[75] Inventors: Ole T. Kragh, Vedbaek; Jens L. Getler, Brønshøj, both of Denmark

[73] Assignee: Anhydro A/S, Soborg, Denmark

[21] Appl. No.: 467,066

[22] Filed: Feb. 16, 1983

Related U.S. Application Data

[63] Continuation of Ser. No. 187,590, Sep. 19, 1980, abandoned.

[30] Foreign Application Priority Data

Sep. 21, 1979 [DK] Denmark .............................. 3959/79

[51] Int. Cl.⁴ .................... C01B 7/00; C01B 17/00; B01J 8/00
[52] U.S. Cl. .................................. 423/242; 423/240; 423/244; 159/4.02
[58] Field of Search ........... 423/240 R, 240 S, 242 A, 423/244 A; 159/4 A, 5, 48.1

[56] References Cited

U.S. PATENT DOCUMENTS

| | | | |
|---|---|---|---|
| 2,069,389 | 2/1937 | Peebles | 159/48 R |
| 3,414,980 | 12/1968 | Nezbed | 159/48 R |
| 3,477,874 | 11/1969 | Repsdorph et al. | 159/48 R |
| 3,674,556 | 7/1972 | Gray, Jr. | 159/48 R |
| 3,748,103 | 7/1973 | Bean et al. | 159/48 R |
| 3,760,565 | 9/1973 | Fish | 243/240 S |
| 3,932,587 | 1/1976 | Grantham et al. | 423/242 |
| 3,966,418 | 6/1976 | Frevel et al. | 422/176 |
| 4,246,242 | 1/1981 | Butler et al. | 423/240 |
| 4,247,525 | 1/1981 | Voeste | 423/242 |
| 4,279,873 | 7/1981 | Felsvang et al. | 423/242 |
| 4,324,770 | 4/1982 | Bakke | 423/242 A |
| 4,375,455 | 3/1983 | Teller et al. | 423/235 X |

FOREIGN PATENT DOCUMENTS 205179 12/1979 Denmark .
141493 3/1980 Denmark .

OTHER PUBLICATIONS

J. Andreasen, Rauchgasreinigung durch Spruhabsorption, VGB Kraftwerkstechnik 60, Heft 3, Marz 1980, pp. 202–208.

Primary Examiner—Gregory A. Heller
Attorney, Agent, or Firm—Ernest F. Chapman

[57] ABSTRACT

By the method there are supplied in an atomizing conditioning plant such chemicals as can react with the gases that it is desired to remove, and which chemicals after having reacted partially with said gases are taken out from the atomizing conditioning chamber as a dry powder and in this condition returned to the chamber to a zone immediately around the atomizer. In this way it is possible to obtain a higher degree of utilization of the chemicals supplied, and potentially a better degree of purification than in the case of conventional methods.

The plant comprises a conditioning chamber (1) with an inlet (2) and an outlet (3) for flue gases, an atomizer (7) and members (8,9,10) to supply a chemical which reacts with the gases that are to be removed, as well as members (11,12) to remove from the chamber products of the reaction and non-reacted chemical as a dry powder. Furthermore, there are provided members (14) to continuously measuring a part of the powder removed and supply it to a pneumatic transport pipe (15) ending in the chamber (1) in close proximity to the atomizer (7).

25 Claims, 1 Drawing Sheet

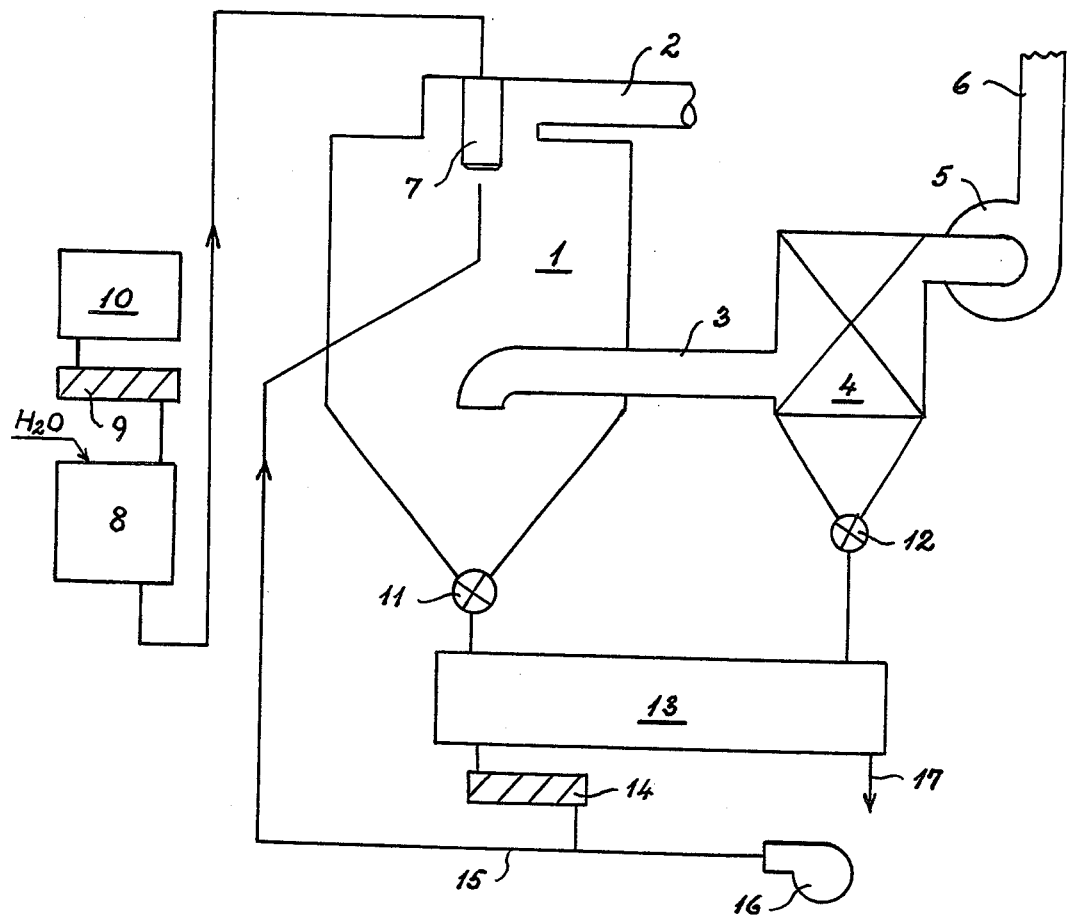

METHOD OF SEPARATING FROM FLUE GASES SUCH GASES AS ARE AGRESSIVE AND INJURIOUS TO THE ENVIRONMENT, AND PLANT TO CARRY THE METHOD INTO EFFECT

This is a continuation of application Ser. No. 187,590, filed Sept. 15, 1980, now abandoned.

BACKGROUND OF THE INVENTION

The present invention relates to a method of separating from flue gases such gases as are aggressive and injurious to the environment, e.g. hydrogen chloride, sulphur dioxide or sulphur trioxide or the like gases, by making the flue gases react in an atomizing conditioning plant with a chemical such as sodium hydroxide or sodium carbonate, calcium hydroxide or calcium carbonate or another chemical which is reactive with the said gas or gases, the products of the reaction and the non-reacted surplus of chemical being removed from the plant as a dry pulverous product, part of which is recirculated through the plant with a view to obtaining a higher degree of utilization.

From application No. 4830/77 for a Danish patent a method is known of removing hydrogen chloride from flue gas originating from the burning of waste materials by absorbing the hydrogen chloride with an alkaline agent, in which said method the flue gas is introduced with a temperature between 200° and 330° C. into a chamber, wherein an aqueous solution of alkaline metal carbonate or an aqueous suspension of calcium hydroxide, calcium carbonate or magnesium oxide is atomized by means of an atomizing wheel, the quantity of solution or suspension being so adjusted that the temperature with which the flue gas leaves the chamber is higher than 125° C., and the material formed by the drying of the atomized solution or suspension leaves the chamber as a dry, freely flowing powder.

In order to improve the efficiency of this process, in which the chemicals must be supplied in stoichiometric surplus, it has been suggested that some of the powder produced be returned to the atomizer as a solution or suspension together with fresh chemical. However, the viscosity of the solution or suspension that is to be atomized sets narrow limits to the quantity of pulverous material that can be recirculated in this way through the plant and consequently also to the useful effect.

It should be noted at this point that in consideration of the functionality of subsequently connected textile and/or electric filters there is a limit to the amount of water that can be supplied to the flue gases in the conditioning process.

BRIEF SUMMARY OF THE INVENTION

The present invention has for its object to provide a method by which there is obtained a better utilization of the chemicals used than by the known technique, as well as an equally good or better degree of purification of the flue gases.

According to the invention this is achieved in the way that a measured portion of the pulverous product removed is returned continuously in dry condition by an air current to the atomizing conditioning chamber of the plant, preferably to a zone immediately around the atomizer.

In this way it is possible practically speaking to recirculate any chosen portion of the dry pulverous product through the plant. Surprisingly, however, it has turned out that even at recirculation of amounts corresponding to what can be recirculated by application of the known technique employing solution or suspension of the powder, corresponding degrees of purification of the flue gases are obtained.

The invention also relates to a plant to carry the method into effect and comprising a conditioning chamber, an inlet for flue gases to the chamber, an outlet for flue gases from the chamber, an atomizer in the upper part of the chamber, and members arranged to supply to the chamber a chemical which is reactive with those of the flue gases which are aggressive or injurious to the environment, as well as members to remove from the chamber the products of the reaction and the non-reacted surplus of chemical as a dry powder, which said plant is characterized by members which are arranged to continuously measuring a part of the powder removed and supply it to a pneumatic transport pipe ending in the chamber in close proximity to the atomizer.

BRIEF DESCRIPTION OF THE DRAWING

The invention will now be described in more detail, reference being had to the drawing, which is a schematic presentation of a plant according to the invention.

DETAILED DESCRIPTION OF THE INVENTION

On the drawing the numeral 1 indicates an atomizing conditioning chamber with an inlet 2 for flue gas and an outlet 3 for flue gas leading to a filter 4, e.g. an electrofilter, from which the flue gases are drawn out by a fan 5 and discharged to the atmosphere through a chimney 6.

In the upper part of the chamber 1 at the flue gas inlet 2 a centrifugal atomizer 7 is provided to atomize an aqueous solution or suspension of a chemical, which is suitable for reaction with those of the flue gases which it is desired to remove, the said fluid being admitted to the atomizer from a mixing tank 8, to which there is supplied water and by way of a dosing mechanism, such as a worm 9, also fresh pulverulent chemical from a store 10.

By the atomization of the fluid in the chamber 1 the water evaporates and leaves a pulverulent product that consists of a mixture of chemicals which have reacted with the injurious gases and chemicals which have not, because in order to obtain a reasonable purification effect it is necessary to supply chemicals in a stoichiometric surplus. The pulverulent product is collected partly in the bottom of the chamber 1, partly in the bottom of the filter 4, wherefrom it can be removed by means of valves 11 and 12, respectively, to a container 13.

By means of a dosing mechanism, such as a worm 14, a measured amount of the dry pulverous product is continuously taken out and returned to the chamber 1 in immediate proximity to the atomizer 7 by way of a pneumatic transport pipe 15, through which a transporting air current is directed from the fan 16. The part of the pulverous product that is not returned to the chamber 1 is discarded as waste, indicated by an arrow 17.

The mode of operation of the plant is that the part of the powder that is returned through the transport pipe 15 to the chamber 1, and which has not reacted with the injurious gases which are to be removed from the flue gas, is moistened in the zone in the immediate proximity of the atomizer 7 and thus becomes capable of reacting with the said gases.

Modifications of the said plant can be contemplated as a matter of course. Thus, a part of the pulverous material can be taken from the container 13 and supplied to the mixing tank 8 together with fresh chemical from the store 10. Another possibility is to supply the fresh chemical from the store 10 by way of the worm 9 to the pneumatic transport pipe 15, in which case pure water is supplied to the atomizer 7.

In the following the invention will be further illustrated by way of some examples.

EXAMPLE 1

To an atomizing conditioning system with a chamber diameter of 2 m a flue gas with a temperature of 175° C. and a content of sulphur dioxide of 300 ppm and a content of fly ash of 4000 mg/Nm$^3$ was supplied.

Slaked lime, corresponding to a stoichiometric ratio of 1.12, and a recirculated amount of powder corresponding to 6 times the freshly supplied dry matter were supplied in suspension to the centrifugal atomizer.

The suspension which had a dry-matter content of 50% had such a viscosity that it was not deemed possible to increase the recirculation still more.

At equilibrium a content of sulphur dioxide of 42 ppm was measured after the system, corresponding to an absorption of 86%.

EXAMPLE 2

In another experiment with the same system a flue gas was supplied with a temperature of 175° C., a sulphur dioxide content of 300 ppm, and a content of fly ash of 4500 mg/Nm$^3$.

To the centrifugal atomizer was supplied a suspension of slaked lime, corresponding to a stoichiometric ratio of 1.10. To the atomizer zone was pneumatically supplied powder from the system's powder outlet in an amount corresponding to 5 times the amount of dry matter that was atomized. A sulphur dioxide content of 48 ppm was measured in the waste gas, corresponding to an absorption of 84%.

EXAMPLE 3

Under the same conditions as in example 2 the recirculated quantity was increased to 13 times the amount of atomized dry matter.

A sulphur dioxide content of 30 ppm in the waste gas was measured, corresponding to an absorption of 90%.

Example 1 refers to the known technique mentioned in the introduction, while in examples 2 and 3 use has been made of the method according to the invention.

It will be noted that even if a slightly smaller amount of powder was recirculated in example 2 than in example 1, while conditions otherwise are comparable, the absorption is almost identical in the two cases, while the absorption in example 3 has been increased not immaterially.

By applying the method and plant according to the invention it is therefore not only a question of obtaining a better utilization of the chemicals used, but also of a better purification of the flue gases than with the known technique.

We claim:

1. In a method of treating flue gases by reacting the flue gases in an atomizing conditioning plant with a chemical selected from the group consisting of sodium hydroxide, sodium carbonate, calcium hydroxide and calcium carbonate, and which chemical is reactive with the gases, and removing the products of the reaction and a nonreacted surplus of the reactive chemical from the plant as a dry pulverous product; the improvement comprising the step of returning a measured portion of the removed pulverous product continuously in dry condition to the atomizing conditioning chamber.

2. The method of treating flue gases according to claim 1 wherein the step of returning a measured portion of the dry pulverous product removed from the conditioning plant having a conditioning chamber with an atomizer, comprises introducing the portion of the product in dry condition proximate the outlet of the atomizer.

3. The method of treating flue gases according to claim 2 wherein the step of returning a measured portion of the dry pulverous product comprises entraining the measured portion continuously in an air current to carry the measured portion continuously to the location proximate the atomizer outlet.

4. The method of treating flue gases according to claim 3 further comprising the step of introducing the reactive chemical into the air current carrying the returning portion of removed dry pulverous product.

5. The method of treating flue gases according to claim 3 further comprising the steps of supplying an aqueous mixture of the reactive chemical into the atomizer for introduction into the conditioning chamber and introducing the air current-carried continuously measured portion of dry pulverous product proximate the atomized emission of the aqueous mixture, whereby introduction of the dry pulverous product is effected.

6. In a method of treating flue gases by reacting the flue gases in a conditioning chamber of an atomizing conditioning plant with a chemical selected from the group consisting of sodium hydroxide, sodium carbonate, calcium hydroxide and calcium carbonate, and which chemical is reactive with the gases, mixing the reactive chemical with water to form an aqueous mixture in a mixing means prior to introduction into the conditioning chamber, atomizing the aqueous mixture upon introduction into the conditioning chamber, and removing the products of the reaction and nonreacted surplus of the reactive chemical from the plant as a dry pulverous product; the improvement comprising the step of returning a measured portion of the removed pulverous product continuously in dry condition to the atomizing conditioning chamber.

7. In a method of treating flue gases by reacting the flue gases in a conditioning chamber of an atomizing conditioning plant with a chemical selected from the group consisting of sodium hydroxide, sodium carbonate, calcium hydroxide and calcium carbonate, and which chemical is reactive with the gases, and removing the products of the reaction and a nonreacted surplus of the reactive chemical from the plant as a dry pulverous product; the improvment comprising the steps of returning a measured portion of the removed dry pulverous product continuously in dry condition to the atomizing conditioning chamber; adding the reactive chemical in dry condition to the measured portion of the removed pulverous product being continuously returned to the atomizing conditioning chamber; and introducing water into the conditioning chamber through an atomizer in the conditioniong chamber.

8. In a process for removing sulfur dioxide from flue gas including the steps of feeding the sulfur dioxide-containing flue gas to a spray dryer, contacting the flue gas with an atomized solution of alkali reactant in a spray zone in a spray drying chamber to form sulfite and sulfate reaction products, spray drying the solution and formed materials in the spray drying chamber to obtain dry particles, conveying the flue gas and dry particles to a dry particle collector and removing the dry particles in the dry particle collector, the improvement therein comprising recycling a portion of the dry particles removed in the dry particle collector and contacting the sulfur dioxide containing-flue gas directly with the dry recycled portion of particles.

9. The improved process as claimed in claim 8 wherein the recycled dry particles contact the flue gas in the spray dryer chamber.

10. The improved process as claimed in claim 8 wherein the recycled dry particles are introduced into the top of the spray dryer chamber and fall vertically downward through the spray zone therein.

11. The improved process as claimed in claim 9 wherein the alkali reactant is lime.

12. The improved process as claimed in claim 10 wherein the alkali reactant is lime.

13. The improved process as claimed in claim 9 wherein the recycled dry particles are conveyed in such a manner that they undergo attrition with creation of fresh particle surface area.

14. The improved process as claimed in claim 10 wherein the recycled dry particles are conveyed in such a manner that they undergo attrition with creation of fresh particle surface area.

15. The improved process as claimed in claim 8 wherein the dry particles removed in the dry collector are conveyed to a storage silo, transported from the storage silo to a splitter apparatus and separated thereby into a recycle stream and a disposal stream.

16. A process for dry scrubbing of flue gas containing sulfur dioxide and flyash particles comprising contacting the flue gas with recycled gas unreacted alkali reactant and alkali-sulfur dioxide reaction products in a spray dryer, contacting the flue gas with an atomized slurry of alkali reactant in a spray zone in the spray dryer to react sulfur dioxide with the alkali, conveying the flue gas and dried alkali-sulfur dioxide reaction products, unreacted alkali reactant and flyash to a dust collection system, collecting the particulate solids, transporting the particulate solids to a splitter apparatus and separating the particulate solids into a recycle stream and a disposal stream, and conveying the particulate solids recycle stream to the spray dryer.

17. In a process for removing sulfur dioxide from flue gas including the steps of feeding the sulfur dioxide-containing flue gas to a spray dryer, contacting the flue gas with an atomized solution of a chemical reactant selected from the group consisting of sodium hydroxide, sodium carbonate, calcium hydroxide and calcium carbonate in a spray zone in a spray drying chamber to form reaction products, spray drying the solution and formed materials in the spray drying chamber to obtain dry particles, conveying the flue gas and dry particles to a dry particle collector and removing the dry particles in the dry particle collector, the improvement therein comprising recycling a portion of the dry particles removed in the dry particle collector and contacting the sulfur dioxide containing-flue gas directly with the recycled portion of particles.

18. The improved process as claimed in claim 17 wherein the recycled particles contact the flue gas in the spray dryer chamber.

19. The improved process as claimed in claim 17 wherein the recycled dry particles are introduced into the spray dryer chamber to fall vertically downward through the spray zone therein.

20. The improved process as claimed in claim 17 wherein the chemical reactant is lime.

21. The improved process as claimed in claim 19 wherein the chemical reactant is lime.

22. The improved process as claimed in claim 18 wherein the recycled dry particles are conveyed in such a manner that they undergo attrition with creation of fresh particle surface area.

23. The improved process as claimed in claim 19 wherein the recycled dry particles are conveyed in such a manner that they undergo attrition with creation of fresh particle surface area.

24. The improved process as claimed in claim 17 wherein the dry particles removed in the dry collector are conveyed to a splitter apparatus and separated thereby into a recycle stream and a disposal stream.

25. A process for dry scrubbing of flue gas containing sulfur dioxide and flyash particles comprising contacting the flue gas with recycled gas unreacted chemical reactant selected from the group consisting of sodium hydroxide, sodium carbonate, calcium hydroxide and calcium carbonate, and said chemical reactant-sulfur dioxide reaction products in a spray dryer, contacting the flue gas with an atomized suspension of said chemical reactant in a spray zone in the spray dryer to react sulfur dioxide with the chemical reactant, conveying the flue gas and dried chemical reactant-sulfur dioxide reaction products, unreacted chemical reactant and flyash to a dust collection system, collecting the particulate solids, transporting the particulate solids to a splitter apparatus and separating the particulate solids into a recycle stream and a disposal stream, and conveying the particulate solids recycle stream to the spray dryer.

* * * * *